(No Model.)
A. BALL.
FRICTION CLUTCH.
No. 396,642. Patented Jan. 22, 1889.
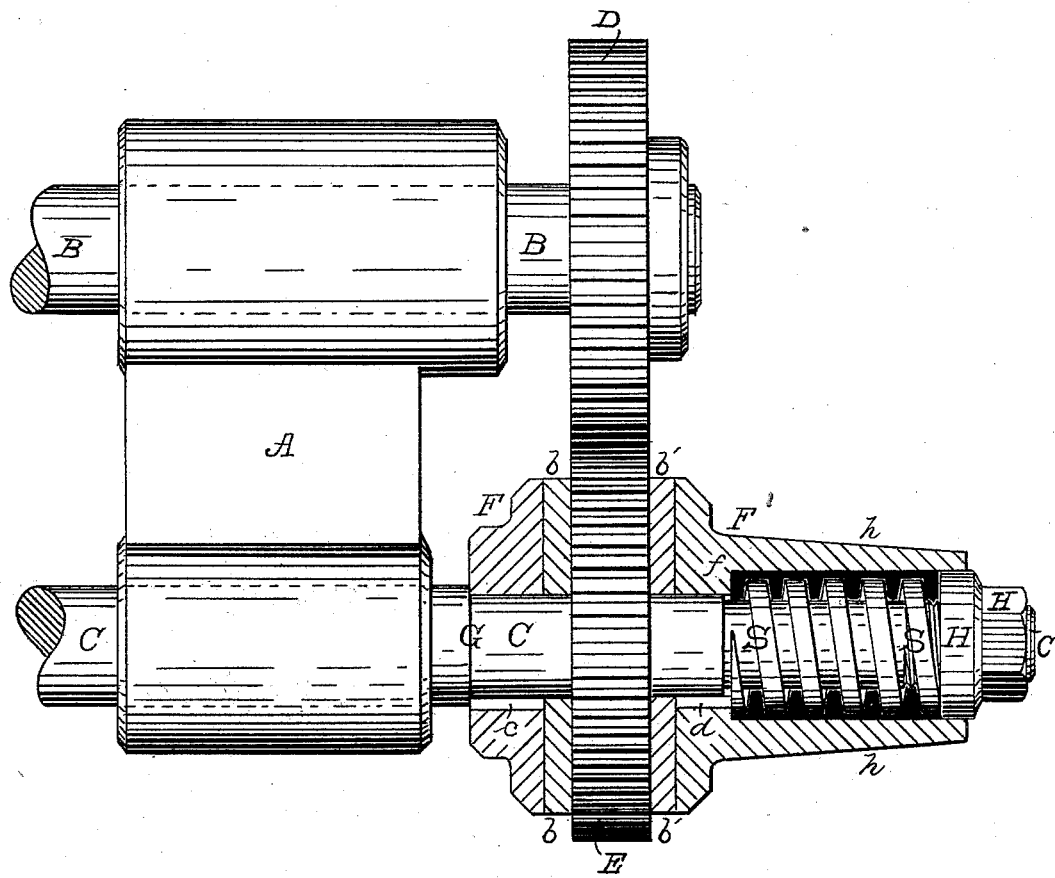
WITNESSES.
Geo. H. Cooper Jr.
Jno. C. Schroeder.
INVENTOR
Albert Ball
PER Geo W Dyer
ATTORNEY.

UNITED STATES PATENT OFFICE.

ALBERT BALL, OF CLAREMONT, NEW HAMPSHIRE, ASSIGNOR TO THE SULLIVAN MACHINE COMPANY, OF SAME PLACE.

FRICTION-CLUTCH.

SPECIFICATION forming part of Letters Patent No. 396,642, dated January 22, 1889.

Application filed December 2, 1885. Serial No. 184,439. (No model.)

*To all whom it may concern:*

Be it known that I, ALBERT BALL, of Claremont, in the county of Sullivan and State of New Hampshire, have invented a new and useful Improvement in Friction-Clutches; and I do hereby declare that the following is a full and exact description of the same, reference being had to the accompanying drawing, and to the letters of reference marked thereon.

My invention relates particularly to a friction-clutch capable of use for various purposes and well adapted for use in connection with diamond rock-drills and in connection with other machinery where obstructions are encountered.

My object is to prevent injury from these obstructions by applying an adjustable regulated elastic pressure to one of a pair of gears, so that if (in the case of a drill) the boring or drilling tool meets with an obstruction offering a resistance greater than the pressure on this gear which drives the feed-shaft the advance of the tool will be retarded without affecting the revolution of the tool or of the main shaft.

The novelty of my invention lies in the construction and arrangement of this clutch, to the end that it shall give an elastic pressure and be easily regulated and adjusted; and for a better understanding of the same in detail attention is invited to the accompanying drawing, which shows a vertical section of my device as it may be applied.

A denotes a frame-work connecting the two shafts B and C, either one of which can be the driver. The shaft B carries a gear, D, which is secured thereto, while the shaft C carries an interlocking gear, E, which is free to turn on its shaft, except as held by the clutch. The shaft C extends beyond the gear E, and after it leaves its bearing A is preferably made smaller, so as to make a shoulder, G, for a purpose hereinafter explained.

The gear E is held between two circular disks or plates, $b$ $b'$, mounted on the shaft C, which disks or plates should be made of some material that will not cut metal or wear the same to any extent.

F is a stationary collar, which is secured upon the shaft C by the spline $c$ and between the shoulder of the shaft G and the disk or plate $b$, and F' is a collar movable upon the shaft $c$, but prevented from turning on the shaft by the spline $d$. This collar F' has a hub, $h$ $h$, which is chambered from a point, $f$, which forms a shoulder. This shoulder $f$ constitutes a seat for the inner end of a spring, S, (preferably spiral,) made of steel or other suitable elastic material and encircling the shaft C. It has a bearing at its outer end against an adjusting-nut, H. This nut H screws upon the shaft C, which is properly threaded to receive the same, and the base of the nut is made of a diameter to snugly fit the bore of the collar F'. By means of this nut the spring is compressed against the shoulder $f$ and the collar F', together with the disk or plate $b'$, at any desired pressure. This pressure may be regulated by the said nut, and the gear E is thereby held more or less firmly between the disks $b$ and $b'$ to revolve with the shaft C. If the resistance to the driven shaft be less than the friction applied by said friction-disks to the gear E, the driven shaft readily revolves through the medium of the gears; but if said resistance equals or exceeds said friction the gear E will slip more or less between the said disks $b$ $b'$ and independent to that extent of its shaft C.

As applied to the feed of diamond rock-drills—more especially for prospecting or well-boring drills—the practical advantage of this device is very great, inasmuch as the hardness of the material encountered is liable to sudden variation, and if very hard material is unexpectedly encountered the boring-tool cannot advance so rapidly, and except for a change in the "feed" or advance in the boring-tool there must be more or less breakage. By this device the tool continues to revolve with the proper degree of pressure until the unusual obstacle is overcome, the gear E slipping more or less between the frictional disks $b$ $b'$.

It will be apparent that this clutch is capable of application to other machines where similar effects need to be produced, and as its application to various machines may necessitate slight changes in construction and arrangement I do not wish to be confined to specific construction and arrangement.

It is obvious that the disks b b' may be dispensed with or made a part of the respective collars F F'; but for economical reasons I prefer to use them. I do not, however, wish to be confined to such use.

Instead of the spiral steel spring S, any other kind of spring of sufficient strength may be used, and, if desirable for any reason, the loose collar F', with spring and nut, may be substituted for the stationary collar F.

Although in the drawing and in the application of my mechanism to my rock-drill the ordinary toothed gears are used, it will be manifest that my friction-clutch can be applied to any method of connecting the driving with the driven shaft, whether it be by toothed or other gearing, such as pulleys, plates, or couplings of another kind; and hence I mean the word "gear" in my claims to be construed as used in such broad sense.

What I claim, and desire to secure by Letters Patent, is—

1. The combination of a shaft, a gear loosely mounted thereon, a friction-plate on each side of said gear, a collar, F, securely fastened to said shaft and bearing against one of said plates, and a collar, F', formed with a chambered hub, h, thereon, inclosing the regulating-spring and bearing against the other plate, and a spring bearing against said collar F' and rendered adjustable by means of a nut, substantially as set forth.

2. The combination, with a suitable shaft and driving-gear on same, of a feed-shaft and loose gear mounted on same between two disks or plates, a fixed and a movable collar on the other sides of said disks or plates, a spiral spring arranged within said movable collar, and an adjusting-nut screwed on the said shaft, substantially as and for the purposes described and shown.

In testimony whereof I affix my signature in presence of two witnesses.

ALBERT BALL.

Witnesses:
GEO. O. BALL,
FRANK A. BALL.